B. E. BEERS.
LOCK.
APPLICATION FILED MAY 14, 1912.

1,087,865.

Patented Feb. 17, 1914.

Witnesses

Inventor
Bradford E. Beers.

By Victor J. Evans
Attorney

UNITED STATES PATENT OFFICE.

BRADFORD E. BEERS, OF VANCOUVER, BRITISH COLUMBIA, CANADA.

LOCK.

1,087,865.

Specification of Letters Patent.

Patented Feb. 17, 1914.

Application filed May 14, 1912. Serial No. 697,396.

*To all whom it may concern:*

Be it known that I, BRADFORD E. BEERS, a subject of the King of Great Britain, residing at Vancouver, in the Province of British Columbia and Dominion of Canada, have invented new and useful Improvements in Locks, of which the following is a specification.

An object of the invention is to provide a lock for use on vehicles to prevent the same from being stolen or carried away.

The invention is particularly adapted for use on self-propelled vehicles such as automobiles and embodies, among other features, a device arranged in connection with a shaft and a wheel so that when the device is in locked position the wheel will be rigid relatively to the shaft, whereas when the device is in unlocked position the wheel will be rotatable relatively to the shaft.

Figure 1:
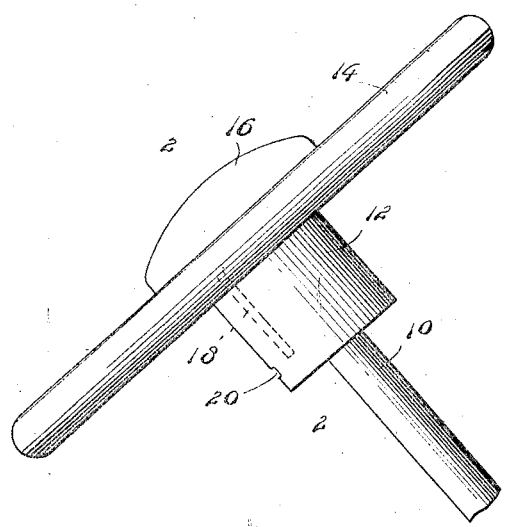
Figure 2:
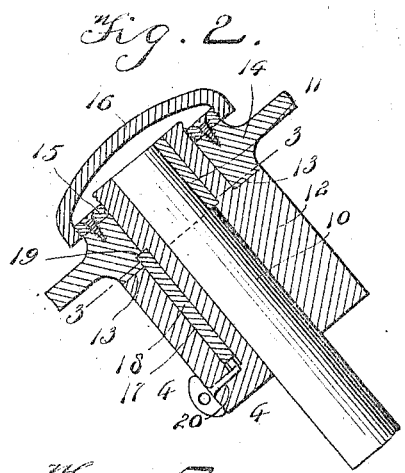
Figure 3:
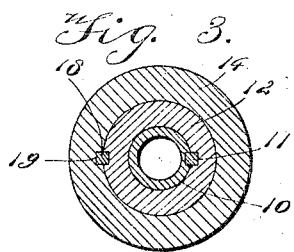
Figure 4:
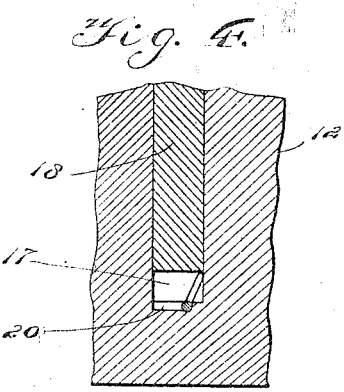
Figure 5:
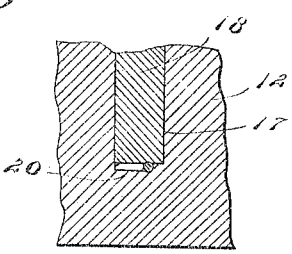

In the further disclosure of the invention reference is to be had to the accompanying drawings constituting a part of this specification, in which similar characters of reference denote corresponding parts in all the views, and in which:

Figure 1 is a side elevation of a steering wheel and shaft showing my device applied thereto, the locking member being shown in dotted lines; Fig. 2 is a fragmentary vertical sectional view; Fig. 3 is a horizontal transverse sectional view taken on the line 3—3 in Fig. 2; Fig. 4 is an enlarged fragmentary sectional view, showing the locking member in locked position and held therein by the key; and Fig. 5 is an enlarged fragmentary sectional view, showing the locking member in locked position.

Referring more particularly to the views, use is made of a steering shaft 10 to which is rigidly secured, by means of a suitable key 11, a cap 12, having the upper portion thereof reduced to form a seat 13 and adapted to receive a steering wheel 14, a collar 15 being arranged to loosely engage the upper end of the cap 12 after being threadedly engaged with the extreme upper end of the cap and also adapted to be screwed to the cap by suitable securing members, the mentioned collar being provided with threads on the periphery thereof and adapted to receive a cover 16 as shown in Fig. 2.

An opening 17 is formed in the cap 12 and slidably mounted in the opening is a locking member 18, the steering wheel 14 being provided with a groove 19 adapted to receive a portion of the locking member 18 when the same is moved into locked position to hold the steering wheel rigid with respect to the cap 12, the mentioned cap being rigidly keyed to the steering shaft 10, as mentioned heretofore. A key-hole 20 is provided in the cap 12, the inner end of the said key-hole terminating adjacent the lower end of the opening 17.

When the locking member 18 is in lowermost position the upper end of the locking member will be out of engagement with the hub of the steering wheel 14, thus permitting a free rotation of the wheel relatively to the cap 12 and the steering shaft 10. When it is desired to lock the wheel to the cap 12 so that when the wheel is operated the shaft 10 will be operated, a key is inserted in the key-hole 20 and a turning movement is imparted thereto so that the ward of the key will engage the lower end of the locking member 18 and move the same upwardly to engage the hub of the wheel, a portion of the upper end of the locking member being adapted to extend into the groove 19 in the hub of the wheel to rigidly lock the wheel to the cap 12.

By referring to Figs. 1, 4 and 5, it will be seen that the key-hole 20 is offset from the vertical plane of the opening 17 so that when the key has been turned to move the locking member upwardly the ward of the key will engage the lower end of the locking member and will also repose against the wall of the opening, thus retaining the locking member in its uppermost position, it being understood that the locking member is loosely mounted in the opening 17 so that the locking member can move downwardly when the key has been withdrawn from the key-hole 20.

Having thus described my invention, I claim:

1. In a device of the class described, the combination with a stationary member, of a key thereon, a cap encircling the stationary member and engaged by the key to retain the cap rigidly on the stationary member, a seat formed at one end of the cap, a rotatable member rotatably supported on the seat and encircling an end of the cap, a cover for the said rotatable member, and a locking member movable in an elongated opening in the cap and adapted to extend into an opening in the rotatable member to lock the rotatable member relatively to the cap, the said locking member being actuated by a key inserted in an opening and engaged with the lower end of the locking member.

2. In a device of the class described including a stationary member, a cap rigid with said member and supported thereby, a seat formed on the cap by reducing one end thereof, a rotatable member supported on the seat, a collar having a threaded periphery fixedly secured to said rotatable member, means for locking the rotatable member relative to the cap, and a cover threadedly connected with the collar.

In testimony whereof I affix my signature in presence of two witnesses.

BRADFORD E. BEERS.

Witnesses:
PAUL H. SALMOND,
H. E. HARVEY.